(12) United States Patent
Akita et al.

(10) Patent No.: US 7,045,241 B2
(45) Date of Patent: May 16, 2006

(54) PROTON CONDUCTIVE SOLID POLYMER ELECTROLYTE AND METHOD FOR PRODUCING THE SAME

(75) Inventors: Hiroshi Akita, Iruma-gun (JP); Teruaki Komiya, Fujimi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 217 days.

(21) Appl. No.: 10/623,064

(22) Filed: Jul. 18, 2003

(65) Prior Publication Data

US 2004/0013926 A1 Jan. 22, 2004

(30) Foreign Application Priority Data

Jul. 18, 2002 (JP) ............... 2002-209258

(51) Int. Cl.
*H01M 8/10* (2006.01)
*C08G 69/26* (2006.01)

(52) U.S. Cl. .............. 429/33; 528/335; 528/337; 528/341; 528/344; 528/347; 528/350; 528/373; 528/377; 528/390; 528/391; 528/423; 429/309; 429/310; 429/324

(58) Field of Classification Search .......... 528/335, 528/337, 342, 344, 347, 350, 373, 377, 390, 528/391, 423; 429/33, 309, 310, 324
See application file for complete search history.

(56) References Cited

U.S. PATENT DOCUMENTS

| 5,525,436 A | 6/1996 | Savinell et al. ............. 429/30 |
| 5,906,716 A | 5/1999 | Mertesdorf et al. |
| 6,124,060 A | 9/2000 | Akita et al. ................. 429/307 |

FOREIGN PATENT DOCUMENTS

| DE | 19817374 | * | 10/1999 |
| DE | 19817374 | A1 | 10/1999 |
| JP | 2000-38472 | | 2/2000 |
| JP | 2001-160407 | A | 6/2001 |
| WO | WO 00/27513 | A2 | 5/2000 |
| WO | WO 00/27513 | A3 | 5/2000 |
| WO | WO 01/94450 | * | 12/2001 |
| WO | WO 01/94450 | A2 | 12/2001 |
| WO | WO 01/94450 | A3 | 12/2001 |

OTHER PUBLICATIONS

"Synthesis and characterization of novel acid-base polymer blends for application in membrane fuel cells"; Solid State Ionics (1999), vol. 125, pop. 243-249.

* cited by examiner

*Primary Examiner*—Samuel A. Acquah
(74) *Attorney, Agent, or Firm*—Lahive & Cockfield, LLP; Anthony A. Laurentano, Esq.

(57) ABSTRACT

A monomer to produce polybenzimidazole is dissolved in polyphosphoric acid. For example, polysulfated phenylene sulfonic acid (acidic group-possessing polymer) is further dissolved in this solution. In this procedure, the acidic group-possessing polymer and the monomer are adsorbed to one another in accordance with the acid-base interaction. When the monomer is polymerized, for example, by means of dehydration polymerization in this state, then polybenzimidazole is synthesized, and the polybenzimidazole and the acidic group-possessing polymer are compatibilized with each other to produce a compatibilized polymer. When the compatibilized polymer is deposited as a solid, and the solid is separated from polyphosphoric acid, then the compatibilized polymer is obtained. A proton conductive solid polymer electrolyte as a final product is manufactured by forming the compatibilized polymer to have a predetermined shape.

7 Claims, 3 Drawing Sheets

FIG. 3

| | MOLE NUMBER OF SULFONIC ACID GROUP PER MOLE OF NH GROUP | RETENTION RATE OF ACIDIC GROUP-POSSESSING POLYMER (%) | PROTON CONDUCTIVITY AT 150 °C ($\times 10^{-6}$ S/cm) |
|---|---|---|---|
| SAMPLE 1 | 3 | 83.4 | 2.5 |
| SAMPLE 2 | 5 | 71.3 | 2.1 |
| COMPARATIVE SAMPLE | – | 35.1 | 2.5 |

PROTON CONDUCTIVE SOLID POLYMER ELECTROLYTE AND METHOD FOR PRODUCING THE SAME

BACKGROUND OF THE INVENTION

1. Field of the Invention

The present invention relates to a proton conductive solid polymer electrolyte to be used for a variety of electrochemical cells including, for example, a fuel cell and a hydrogen and oxygen generator for generating hydrogen and oxygen by electrolyzing water, and a method for producing the same.

2. Description of the Related Art

In the case of the fuel cell, for example, an electrolyte is interposed between an anode to which fuel gas containing hydrogen is supplied and a cathode to which oxygen-containing gas such as air is supplied. The electrolyte moves the hydrogen ion (proton), which is generated by ionizing hydrogen contained in the fuel gas on the anode, to the cathode. In other words, the electrolyte serves as a proton conductor in the fuel cell.

A material, which is obtained by humidifying a perfluorosulfonic acid polymer membrane with liquid water, is widely known as an example of the proton conductor which acts as the electrolyte of the fuel cell. The proton conductivity of the membrane lowers as the membrane is dried. For this reason, in order to maintain the power generation characteristics of the fuel cell, the membrane is prevented from being dried by keeping the fuel gas and/or the oxygen-containing gas contained with steam to continuously replenish the membrane with water, and supplying a cooling medium into the fuel cell to maintain the operation temperature at 80° to 90° C.

In recent years, a composite electrolyte comprising a base material of basic solid polymer such as polybenzimidazole, the base material impregnated with liquid inorganic strong acid such as phosphoric acid (see U.S. Pat. No. 5,525,436), and a composite electrolyte comprising a base material of meta-polyaniline and constructed in the same manner as described above (see Japanese Laid-Open Patent Publication No. 2001-160407) have been suggested.

The two types of the composite electrolytes described above have high proton conductivities even in a dried state. Therefore, it is unnecessary to use any humidifiers. Further, because the fuel cell can be operated at high temperatures, the cooling system may be small. Therefore, the fuel cell system can also be constructed simply and small in size.

As well-known, $H_2O$ is produced when the fuel cell is operated. When the fuel cell is operated at relatively low temperatures, for example, during the start-up operation or during the low output operation of the fuel cell, $H_2O$ is in a form of liquid water.

Meanwhile, phosphoric acid has an extremely high degree of liquid absorption. Therefore, when the composite electrolyte as described above is adopted as an electrolyte of the fuel cell, a quantity of the $H_2O$ which is produced by the operation of the fuel cell is absorbed by phosphoric acid. In particular, phosphoric acid absorbs the liquid during the low temperature operation such as the start-up operation and the low output operation. Therefore, the concentration of phosphoric acid is lowered, and the amount of phosphoric acid is increased. When the amount of phosphoric acid exceeds an amount which the base material of the composite electrolyte is capable of retaining, phosphoric acid begins to exude out of the composite electrolyte.

The exudate phosphoric acid is discharged outside of the fuel cell via the fuel gas passage which supplies the fuel gas to the anode, and/or via the oxygen-containing gas passage which supplies the oxygen-containing gas to the cathode. Namely, phosphoric acid outflows, and the concentration of phosphoric acid remaining in the base material of the composite electrolyte is lowered. Therefore, the proton conductivity of the composite electrolyte is lowered. Consequently, the internal resistance of the fuel cell rises, deteriorating the power generation characteristics of the fuel cell.

In order to improve the water absorption of such phosphoric acid, the following suggestion has been made in U.S. Pat. No. 6,124,060 and Japanese Laid-Open Patent Publication No. 2000-38472. H of the —OH group possessed by phosphoric acid ($OP(OH)_3$) is substituted with a functional group having phenyl group to produce substituted acid as illustrated in the following chemical formulas (1) and (2). In the chemical formulas (1) and (2), R represents H, alkyl group having a number of carbon atom or atoms of 1 to 5, halogen group, or nitro group.

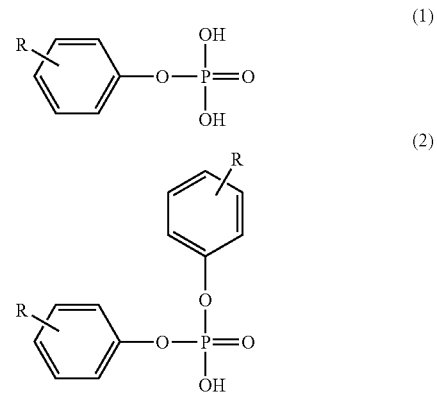

A polymer having imidazole ring is impregnated with the substituted acid to form a composite electrolyte (proton conductive solid polymer electrolyte).

The substituted acid has a low degree of water absorption as compared with phosphoric acid. Therefore, it is possible to avoid the increase in amount of the substituted acid, and it is possible to avoid the decrease in concentration.

However, there is a great demand to obtain an electrolyte which has an excellent ability to retain the components that contribute to the proton conductivity even when the operation is performed under the condition in which a large amount of liquid water is produced, for example, during the operation at low temperatures as described above.

The substance or material, which exhibits proton conductivity, is exemplified by an acidic group-possessing organic compound bonded with a functional group (acidic group) which makes any bonded substance to be acidic. In order to lower the degree of elution of the acidic group-possessing organic compound into water, it is conceived that the acidic group-possessing organic compound molecules are polymerized with each other to produce an acidic group-possessing polymer.

In order for the proton conductivity to be substantially equivalent to one another even when the operation condition resides in low temperature or high temperature with low humidity, it is necessary to obtain a large mole number of the acidic group contained per gram of the acidic group-possessing polymer. Specifically, $9 \times 10^{-4}$ mole of acidic group is contained in 1 g of the polymer of perfluorosulfonic acid, but an amount, which is several times the above, is required.

If, however, the mole number of the acidic group is increased, the acidic group-possessing polymer becomes water-soluble. Therefore, if the mole number of the acidic group is excessively increased, then the acidic group-possessing polymer is dissolved in liquid water produced, for example, in the low temperature operation, and the power generation characteristics of the fuel cell are deteriorated.

A method for suppressing the water solubility in the acidic group-possessing polymer is to blend the acidic group-possessing polymer and a basic polymer. In general, as reported by J. Kerres et al. in Solid State Ionics (1999), Vol. 125, pp. 243–249, such a blend polymer is obtained by blending the acidic group-possessing polymer and the basic polymer in an organic solvent.

However, if the same operation is performed by using an acidic group-possessing polymer having a large mole number of acidic group per gram, in order for the proton conductivity to be substantially equivalent to one another even when the operation condition resides in low temperature or high temperature with low humidity as described above, the gelation is caused by the acid-base interaction in the organic solvent. Therefore, the acidic group-possessing polymer and the basic polymer are not blended sufficiently.

As described above it is difficult to prepare a material which contains the basic polymer and the acidic group-possessing polymer having a large mole number of acidic group.

SUMMARY OF THE INVENTION

A principal object of the present invention is to provide a proton conductive solid polymer electrolyte which has an excellent ability to retain an acidic group-possessing polymer that contributes to the proton conduction and which makes it possible to secure characteristics of an electrochemical cell thereby, and a method for producing the same.

According to one aspect of the present invention, there is provided a proton conductive solid polymer electrolyte comprising an acidic group-possessing polymer which has an acidic group and polybenzimidazole, wherein:

the acidic group-possessing polymer is a substance which is soluble in a solvent to dissolve a monomer for producing the polybenzimidazole; and the acidic group-possessing polymer and the polybenzimidazole are compatibilized with each other.

The term "compatibility" referred to in the present invention means a state in which the acidic group-possessing polymer and the basic polymer are mixed without causing any phase separation. The term "compatibilized polymer" means a polymer which is compatibilized or in compatibility.

In the proton conductive solid polymer electrolyte containing the compatibilized polymer as described above, the acidic group-possessing polymer is hardly eluted into the solution or liquid. Accordingly, even when the electrolyte is used for a fuel cell in which any liquid water is produced depending on the operation condition, the elution of the acidic group-possessing polymer into the liquid water is remarkably suppressed. Therefore, it is possible to avoid the deterioration of the power generation characteristics of the fuel cell. Further, the proton conductivity is not lowered when the polymer is compatibilized.

The proton conductive solid polymer electrolyte exhibits excellent proton conductivity even in the case of a dried state. Accordingly, when the proton conductive solid polymer electrolyte is used for a fuel cell, it is unnecessary to provide any additional equipment such as a humidifier. Therefore, it is also possible to miniaturize the fuel cell system.

The polymerization from the monomer into the polybenzimidazole is generally performed in polyphosphoric acid. Therefore, it is preferable that the acidic group-possessing polymer is a substance which is soluble in polyphosphoric acid.

It is preferable that the acidic group of the acidic group-possessing polymer is in an amount not less than $3 \times 10^{-3}$ mole per gram of the acidic group-possessing polymer, for the following reason. That is, the acidic group-possessing polymer as described above is easily soluble, for example, in polyphosphoric acid, and it is also possible to secure the proton conductivity of the proton conductive solid polymer electrolyte.

According to another aspect of the present invention, there is provided a method for producing a proton conductive solid polymer electrolyte comprising an acidic group-possessing polymer which has an acidic group and a basic polymer which is basic, the method comprising:

a first step of dissolving, in a solvent, the acidic group-possessing polymer and a monomer which produces polybenzimidazole by means of polymerization, polymerizing the monomer to produce the polybenzimidazole, and compatibilizing the polybenzimidazole and the acidic group-possessing polymer with each other to produce a compatibilized polymer; and a second step of separating the compatibilized polymer from the solvent.

In this production method, the acidic group-possessing polymer is dissolved in the solvent in which the monomer for producing the polybenzimidazole can be dissolved. The acidic group-possessing polymer and the monomer, which are dissolved in the solvent, are adsorbed into one another in accordance with the acid-base interaction. Accordingly, the compatibilzation is easily advanced for the acidic group-possessing polymer and the polybenzimidazole produced by the polymerization of the monomer. Therefore, the compatibilized polymer can be produced easily and conveniently.

Preferred examples of the solvent may include polyphosphoric acid.

Preferred examples of the acidic group-possessing polymer which is easily soluble in the solvent such as polyphosphoric acid may include a polymer which has the acidic group in an amount of not less than $3 \times 10^{-3}$ mole per gram of the acidic group-possessing polymer. Further, when the acidic group-possessing polymer as described above is used, it is possible to obtain the proton conductive solid polymer electrolyte having an excellent proton conductivity.

In order to polymerize the monomer, for example, the monomer may be subjected to dehydration polymerization in the presence of acid.

Preferred examples of the monomer which is polymerizable by means of dehydration polymerization may include a mixture of aromatic tetramine and aromatic dibasic acid. Alternatively, it is also preferable to use an aromatic compound which has a carboxylate ester group and a pair of amino groups bonded to an aromatic nuclear, the pair of amino groups being mutually positioned at ortho-positions.

It is a matter of course that the monomer as described above may be polymerized in accordance with another method.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 shows a table illustrating the rate of retention of the acidic group-possessing polymer and the proton conductivity at 150° C., obtained in each disk-shaped thin membranes prepared in Samples 1 and 2 and Comparative Sample.

DESCRIPTION OF THE PREFERRED EMBODIMENTS

A detailed explanation will be made below with reference to the accompanying drawings of the proton conductive solid polymer electrolyte according to the present invention and the method for producing the same as exemplified by preferred embodiments.

Figure 1:
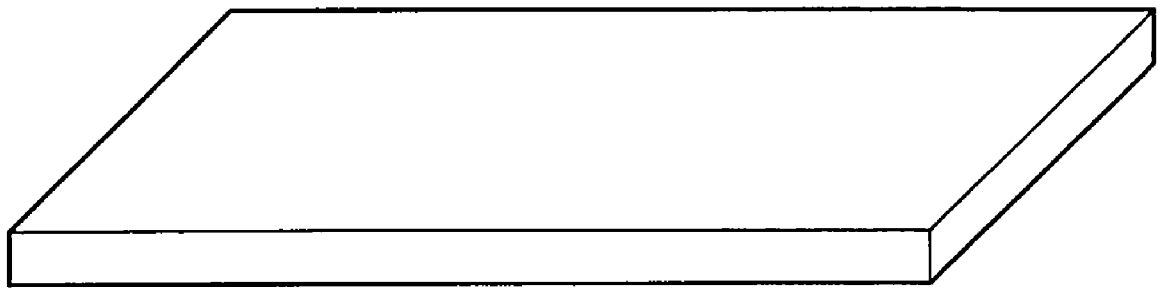
FIG. 1 shows a schematic perspective view illustrating an entire proton conductive solid polymer electrolyte according to an embodiment of the present invention.

A proton conductive solid polymer electrolyte according to an embodiment of the present invention is shown in FIG. 1. The proton conductive solid polymer electrolyte 10 contains a compatibilized polymer, in which an acidic group-possessing polymer having an acidic group, and polybenzimidazole are compatibilized. The "acidic group" herein represents a "group for allowing a polymer to which the acidic group is bonded to exhibit the acidity". That is, the acidic group-possessing polymer exhibits acidity.

Those which are soluble in a solvent for dissolving a monomer for producing polybenzimidazole are selected as the acidic group-possessing polymer, for the following reason. As described later on, the monomer for producing polybenzimidazole is polymerized after dissolving the monomer in the solvent. Therefore, if the monomer is not soluble in the solvent, the compatibilized polymer cannot be produced.

Usually, polybenzimidazole is synthesized in polyphosphoric acid. In preferred examples of the acidic group-possessing polymer which is soluble in polyphosphoric acid, the mole number of the acidic group in the acidic group-possessing polymer may be not less than $3 \times 10^{-3}$ mole per gram.

When the proton conductive solid polymer electrolyte 10, which contains the acidic group-possessing polymer having a relatively large amount of the acidic group, is used, for example, for an electrolyte of a fuel cell, and the proton conductivity can be made substantially equivalent to one another even when the fuel cell is operated under any one of the condition in which the temperature is low and the humidity is high or the temperature is high and the humidity is low. More preferably, the mole number of the acidic group should not be less than $4 \times 10^{-3}$ mole.

The repeating unit of the acidic group-possessing polymer is not specifically limited. However, preferred examples may include aromatic compounds, heterocyclic compounds, fluorine compounds, and inorganic compounds.

Specified examples of the acidic group-possessing polymer include substances represented by the following chemical formulas (3) to (8):

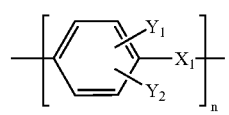
(3)

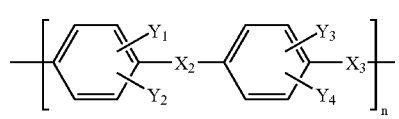
(4)

In the chemical formulas (3) and (4), X1, X2, X3 are any one of S, $SO_2$, O, CO, and $CH_2$. X2 and X3 may be the same, or they may be different. On the other hand, at least one of Y1, Y2, Y3, Y4 is any one of $SO_3H$, $OPO(OH)_2$, and $PO(OH)_2$. Y1 and Y2, and Y3 and Y4 may be bonded at any position provided that the position does not participate in the principal chain bond of the polymer. In the following description, those having the same functional group are represented by the same symbols.

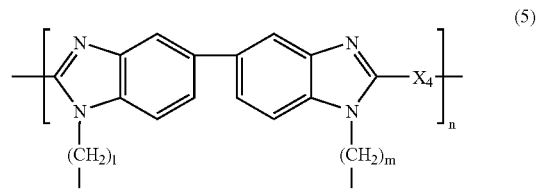
(5)

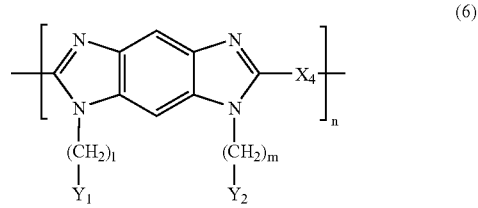
(6)

In the chemical formulas (5) and (6), l and m are integers of 1 to 10, which numbers may be the same, or they may be different. X4 represents any one of the following compounds:

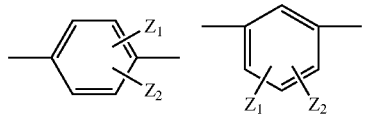

In the foregoing chemical formulas, Z1 and Z2 are functional groups which are independently selected from H, $SO_3H$, $OPO(OH)_2$, and $PO(OH)_2$.

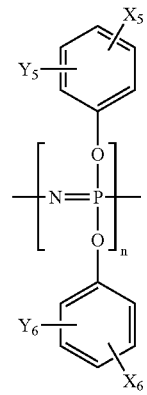
(7)

In the chemical formula (7), X5 is $SO_3H$, and X6 is any one of H and $SO_3H$. Y5 and Y6 are functional groups which are independently selected from H, $CH_3$, $C_2H_5$, F, Cl, and Br.

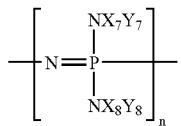

(8)

In the chemical formula (8), X7 represents $(CH_2)_m SO_3H$ (m is an integer of 1 to 10), and X8 represents any one of $(CH_2)_m SO_3H$ (m is an integer of 1 to 10), $NH_2$, H, $CH_3$, $C_2H_5$, and $C_6H_5$ (phenyl group, hereinafter also referred to as "Ph"). Y7 and Y8 are functional groups which are independently selected from H, $CH_3$, $C_2H_5$, and Ph.

On the other hand, polybenzimidazole has benzimidazole in the repeating unit, which is specifically exemplified by substances represented by the following chemical formulas (9) to (15):

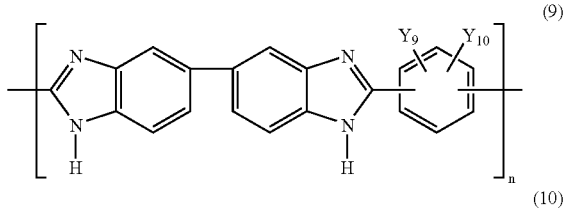

(9)

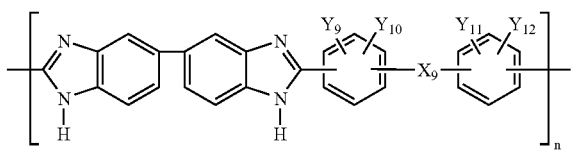

(10)

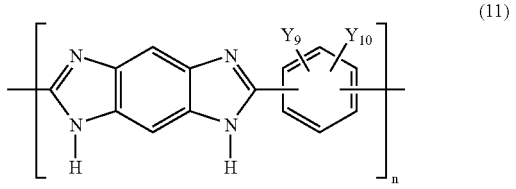

(11)

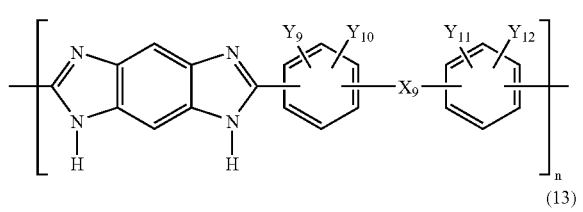

(12)

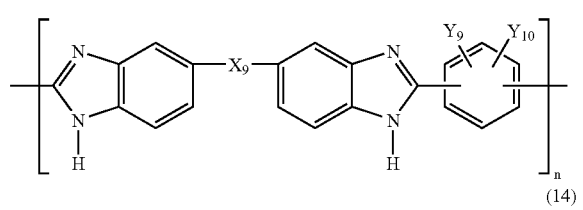

(13)

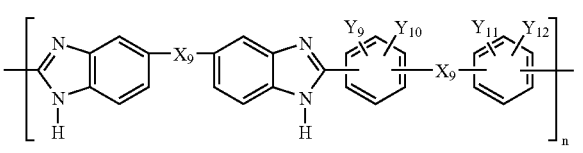

(14)

(15)

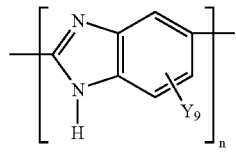

In the chemical formulas (9) to (15), X9 represents O, S, $SO_2$, $CH_2$, or CO, and Y9 to Y12 are functional groups which are independently selected from H, $CH_3$, $C_2H_5$, F, Cl, I, Br, and Ph.

The proton conductive solid polymer electrolyte 10 may contain the compatibilized polymer composed of the components as described above as well as a polymer having the proton conductivity such as sulfonated polyketone having sulfonic acid group.

When the proton conductive solid polymer electrolyte 10 constructed as above is used as an electrolyte of the fuel cell, then a fuel gas containing hydrogen is supplied to the anode of the fuel cell, and an oxygen-containing gas containing oxygen is supplied to the cathode. During this process, hydrogen is ionized into protons and electrons on the anode.

The electrons are taken out of the fuel cell system to be used as DC electric energy for energizing an external load, and then the electron return to the cathode. Meanwhile, the protons arrive at one end surface of the proton conductive solid polymer electrolyte 10. Any one of the basic polymers described above has proton conductivity, and the acidic group-possessing polymer assists the movement of the proton. Therefore, the proton is easily moved to the other end surface of the proton conductive solid polymer electrolyte 10, and the protons return to the cathode. The protons, electrons, and oxygen contained in the oxygen-containing gas supplied to the cathode react to produce $H_2O$ thereby.

When the fuel cell is operated at a low temperature, for example, during the start-up operation of the fuel cell, $H_2O$ is produced as liquid water to make contact with the proton conductive solid polymer electrolyte 10. However, the acidic group-possessing polymer and the basic polymer are compatibilized with each other in the proton conductive solid polymer electrolyte 10. Accordingly, the elution resistance of the acidic group-possessing polymer is remarkably improved. Therefore, even when the liquid water makes contact with the proton conductive solid polymer electrolyte 10, the elution of the acidic group-possessing polymer into water is remarkably prevented.

That is, when the proton conductive solid polymer electrolyte 10 according to the embodiment of the present invention is used, the elution of the acidic group-possessing polymer into water is suppressed even when contact with liquid water. Therefore, it is possible to maintain proton conductivity.

Further, even when the fuel cell reaches the operation temperature, and $H_2O$ is produced as steam, it is also possible to avoid the reduction of proton conductivity, because the acidic group of the acidic group-possessing polymer exists in an amount not less than the predetermined mole number. In other words, the proton conductivity obtained when the fuel cell is operated in a high temperature low humidity, can be made to be substantially equivalent to the proton conductivity obtained when the fuel cell is operated under a condition in which water is produced.

Further, the proton conductive solid polymer electrolyte 10 exhibits excellent proton conductivity in a wide temperature range, even in a dried state, as described later on. Accordingly, when the proton conductive solid polymer electrolyte 10 is used for the fuel cell, it is unnecessary to provide any additional equipment such as a humidifier. Therefore, it is also possible to miniaturize the fuel cell system.

The proton conductive solid polymer electrolyte 10 can be used as a solid electrolyte even in the case of electrochemical cells other than the fuel cell, including, for example, a hydrogen and oxygen generator for generating hydrogen and oxygen by electrolyzing water.

Figure 2:
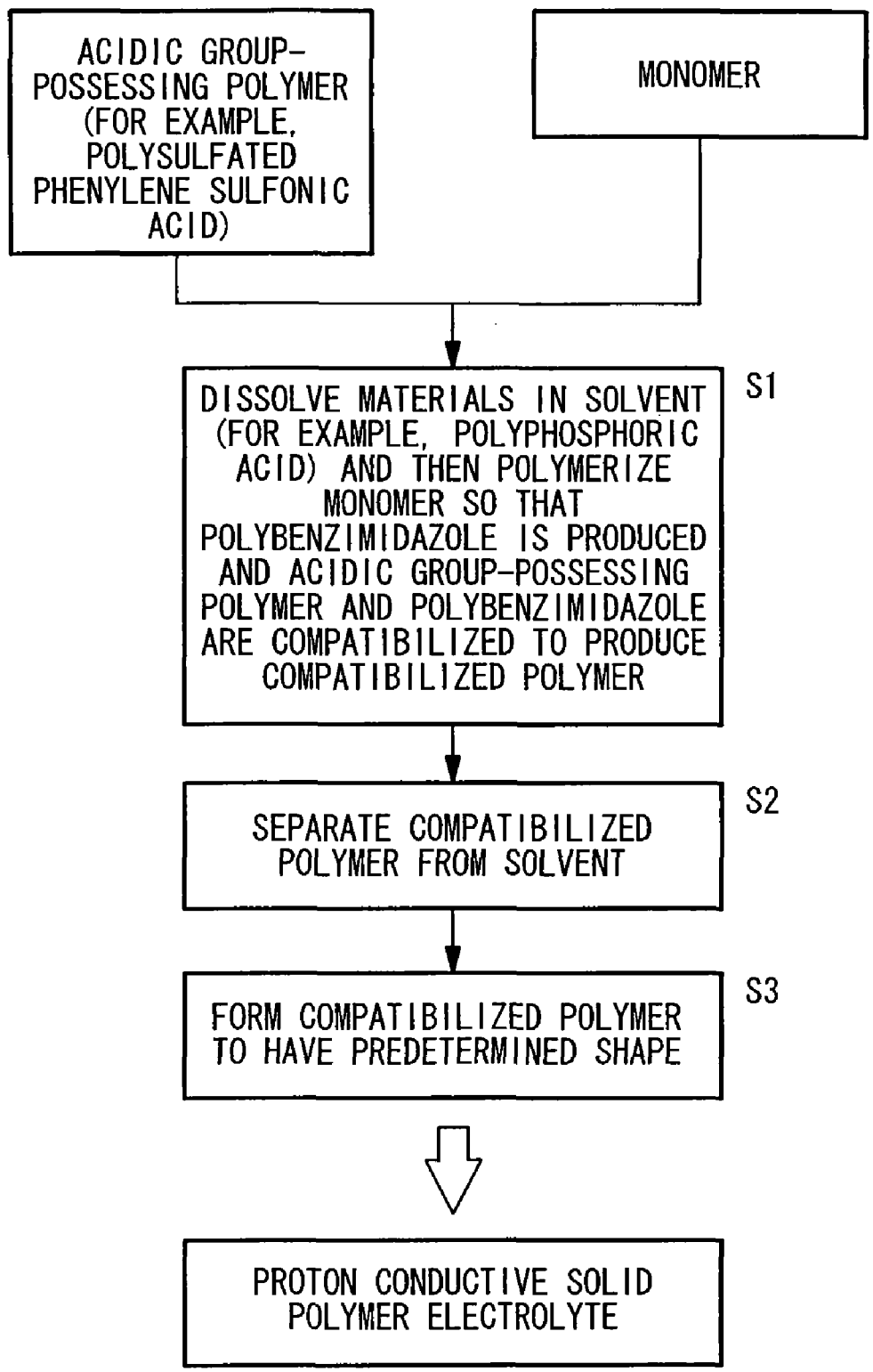
FIG. 2 shows a flow chart illustrating a method for producing the proton conductive solid polymer electrolyte according to the embodiment of the present invention.

Next, a method for producing the proton conductive solid polymer electrolyte 10 will be explained with reference to FIG. 2 as a flow chart. This production method comprises a first step S1 of dissolving raw materials in a solvent to polymerize a monomer contained in the raw materials, and obtain a compatibilized polymer in a solid form, a second step S2 of separating the compatibilized polymer from polyphosphoric acid, and a third step S3 of forming the separated compatibilized polymer to have a predetermined shape.

At first, in the first step S1, the monomer as the raw material for polybenzimidazole is dissolved in the solvent such as polyphosphoric acid.

Preferred examples of the monomer may include a mixture of aromatic tetramine as represented by the following chemical formulas (16) to (18) and aromatic dibasic acid as represented by the following chemical formulas (19) and (20):

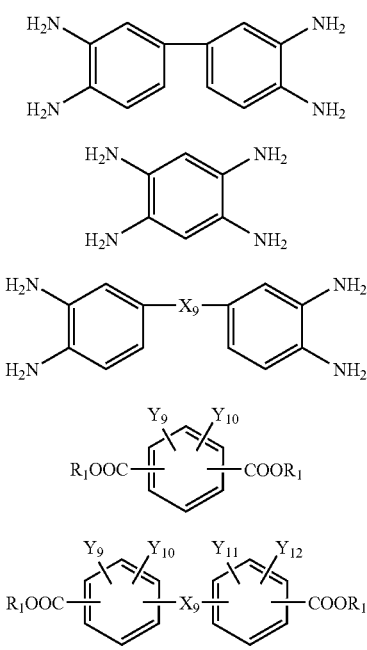

As described above, X9 in the chemical formula (18) represents any one of O, S, $SO_2$, $CH_2$, and CO. Y9 to Y12 in the chemical formulas (19) and (20) are functional groups which are independently selected from H, $CH_3$, $C_2H_5$, F, Cl, I, Br, and Ph. R1 represents H, $CH_3$, $C_2H_5$, or Ph.

The polybenzimidazoles shown in the chemical formulas (9) and (10) are obtained by effecting dehydration polymerization with the substance shown in the chemical formula (16) and the substances shown in the chemical formulas (19) and (20) respectively. In this case, dehydration polymerization may be performed in the presence of acid such as hydrochloric acid.

Similarly, when the substance shown in the chemical formula (17) and the substances shown in the chemical formulas (19) and (20) are subjected to dehydration polymerization respectively, the polybenzimidazoles shown in the chemical formulas (11) and (12) are obtained respectively. When the substance shown in the chemical formula (18) and the substances shown in the chemical formulas (19) and (20) are subjected to dehydration polymerization respectively, the polybenzimidazoles shown in the chemical formulas (13) and (14) are obtained respectively.

Another preferred example of the monomer may be exemplified by an aromatic compound represented by the following chemical formula (21). The aromatic compound has a pair of amino groups and a carboxylate ester group bonded to the aromatic nuclear. In the aromatic nuclear, the pair of amino groups are mutually positioned at ortho-positions. R1 and Y9 in the chemical formula (21) are the same as those as described above.

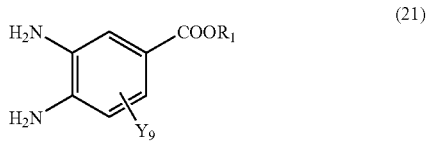

When the substance shown in the chemical formula (21) is subjected to dehydration polymerization, the polybenzimidazole shown in the chemical formula (15) is obtained. Also in this case, the dehydration polymerization is preferably performed in the presence of acid such as hydrochloric acid.

In the above, for example, when hydrochloride is used as the monomer, dehydration polymerization is effected by hydrochloric acid liberated from the hydrochloride. Therefore, it is unnecessary to add hydrochloric acid.

The acidic group-possessing polymer as represented by the foregoing chemical formulas (3) to (8) is added to the solvent in which the monomer is dissolved as described above.

In the solvent, the acidic group-possessing polymer and the monomer as described above are adsorbed by means of weak force in the solvent. When a polymerizing agent such as isophthalic acid is added in this state, dehydration polymerization of the basic monomer is caused. As a result, the compatibilized polymer of the basic polymer and the acidic group-possessing polymer is produced in the solvent, and the compatibilized polymer is deposited as a granular solid.

Subsequently, in the second step S2, the solvent is separated from the granular solid of the compatibilized polymer by means of, for example, filtration, and then the granular solid is dried. As a result, a dry powdery solid of the compatibilized polymer is obtained.

Subsequently, in the third step S3, a membrane is manufactured. That is, the dry powdery solid is pulverized to obtain fine powder, and the fine powder is compressively formed to have a shape of a membrane. Alternatively, the dry powdery solid may be melted to obtain a molten liquid, and the molten liquid may be injection-molded to have a shape of a membrane. Further, the dry powdery solid may be dissolved in a solvent, and the obtained solution may be cast on a smooth surface such as a glass plate, followed by removal of the solvent by means of, for example, volatilization to form a membrane.

In any method, a polymer with proton conductivity such as sulfonated polyketone having sulfonic acid group may be contained. In this procedure, the polymer may be pulverized, melted, or dissolved together with the dry powdery solid.

The membrane composed of the compatibilized polymer, i.e., the membrane of the proton conductive solid polymer electrolyte 10 can be formed in accordance with the method as described above.

Thus, the membrane, which is composed of the proton conductive solid polymer electrolyte 10, is obtained as described above.

EXAMPLES

Example 1

Synthesis of Polysulfated Phenylene Sulfonic Acid (Acidic Group-possessing Polymer)

The processes, which followed the procedures represented by the following chemical reaction formulas, were performed exactly in accordance with a certain sequence, and thus polysulfated phenylene sulfonic acid as the acidic group-possessing polymer was prepared.

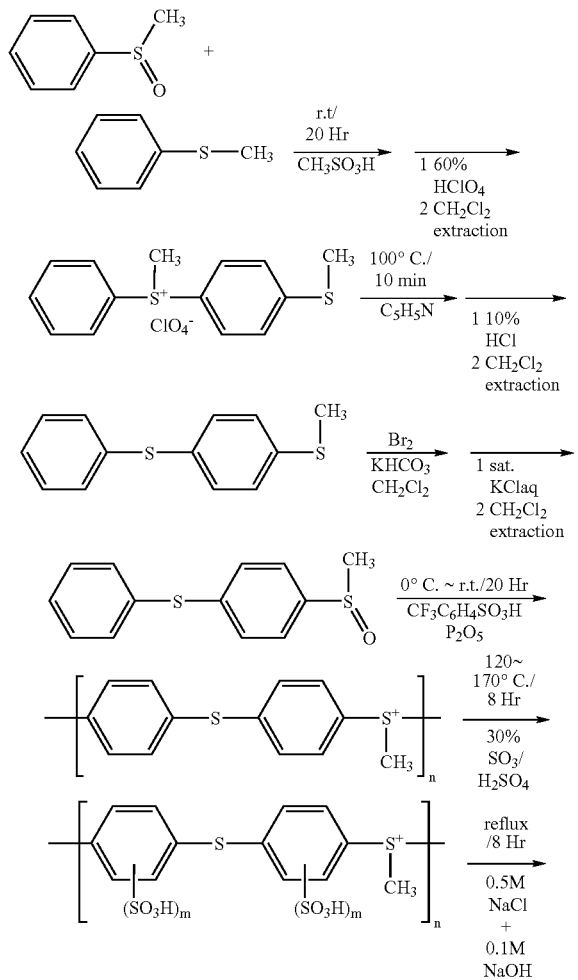

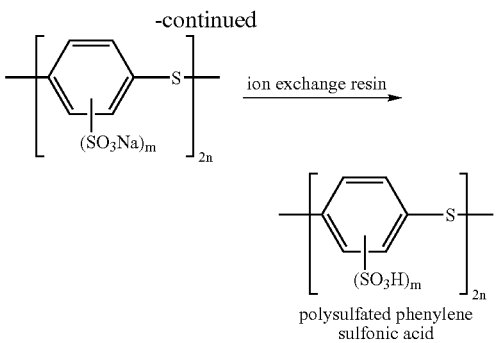

polysulfated phenylene sulfonic acid

At first, 15 g of methyl phenyl sulfoxide was dissolved in 13.3 g of thianisole in an argon atmosphere. 214 ml of methanesulfonic acid-was dropped to an obtained solution while cooling the solution to perform the reaction for 20 hours at room temperature.

This solution was mixed with 214 ml of perchloric acid having a concentration 60%, followed by being agitated for 1 hour. When 100 ml of deionized water and 100 ml of methylene chloride were added thereto, the mixture was separated into an aqueous layer and an organic layer. Of these layers, the aqueous layer was extracted with methylene chloride, and then the extracted matter was added to the organic layer. Methylene chloride was removed under a reduced pressure to obtain a reaction product.

Subsequently, the obtained reaction product was dissolved in 175 ml of pyridine, followed by being agitated for 30 minutes and then being heated to 100° C. After being left to stand to effect the cooling, the solution was mixed with 1000 ml of hydrochloric acid having a concentration of 10%. The mixture solution was extracted with methylene chloride to obtain a reaction product to which 87 ml of an aqueous solution of potassium hydrogencarbonate having a concentration of 10% and 100 ml of methylene chloride were added. A solution, which was obtained by dissolving 13.8 g of bromine in 100 ml of methylene chloride, was dropped at room temperature to the additive.

A saturated aqueous solution of 200 ml of potassium chloride was added to the additive, followed by being extracted with methylene chloride and then being dried with sodium sulfate. The dried matter was further exposed to a vacuum atmosphere to volatilize and remove the solvent thereby, and thus an acidic group-possessing monomer was obtained.

20 g of the monomer was cooled with ice in an argon atmosphere, to which 100 g of trifluoromethanesulfonic acid was added in this state. Further, 10 g of diphosphorus pentoxide was added, followed by being agitated for 20 hours at room temperature to polymerize the monomer.

The obtained polymer was washed with deionized water, followed by being dried at 80° C. in vacuum. Subsequently, 500 g of fuming sulfuric acid having a concentration of 30% was added to the polymer in an argon atmosphere, followed by being reacted for 8 hours at 120° to 170° C. to sulfonate the polymer.

After being left to stand to effect the cooling, the sulfonated polymer was poured into 2000 ml of ethanol together with fuming sulfuric acid to produce a precipitate. The precipitate was washed and neutralized, and then the precipitate was dissolved in 1000 ml of an aqueous mixture solution containing sodium chloride at a concentration of 0.5

M (mol/l) and sodium hydroxide at a concentration of 0.1 M, followed by being refluxed for 8 hours.

After being left to stand to effect the cooling, a dialysis treatment was performed for 48 hours, and the solution was allowed to pass through a column filled with an ion exchange resin to substitute sodium ion with proton. Further, the aqueous solution was dehydrated under a reduced pressure to obtain a fine powder of polysulfated phenylene sulfonic acid as the acidic group-possessing polymer. The degree of sulfonation of polysulfated phenylene sulfonic acid was 1.74 per phenyl group.

Example 2

Preparation of Membrane Compatibilized Polymer

Commercially available polyphosphoric acid having a concentration of 116% as calculated by conversion into phosphoric acid was retained at 120° C. in an Ar atmosphere, to which 1.20 g of 3,3-diaminobenzidine tetrahydrochloride was added. As a result, hydrochloric acid was produced. After completion of the production of hydrochloric acid, 2.60 g of polysulfated phenylene sulfonic acid obtained in Example 1 was added, followed-by being agitated for 8 hours to dissolve polysulfated phenylene sulfonic acid in polyphosphoric acid. In this procedure, it was confirmed that the viscosity of the solution was raised as time elapsed.

The temperature of the solution was raised to 160° C., and 0.50 g of isophthalic acid as a polymerizing agent for 3,3-diaminobenzidine was added to perform a polymerization reaction for 8 hours at 160° to 180° C. After being left to cool, the solution was poured into a large amount of deionized water to solidify a reaction product.

A deposited fine powdery solid was washed with water, followed by being dried in vacuum at 80° C. to obtain a powdery compatibilized polymer containing polysulfated phenylene sulfonic acid and polybenzimidazole represented by the following chemical formula (22).

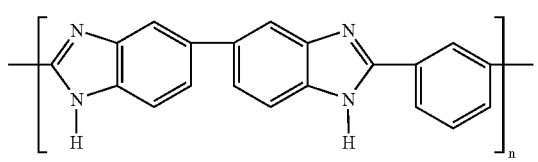

(22)

In the compatibilized polymer, the ratio between the sulfonic acid group of polysulfated phenylene sulfonic acid and the NH group of polybenzimidazole was 3:1 in molar ratio.

The powdery compatibilized polymer was compressively formed with a hand press machine at 137.3 kPa to obtain a disk-shaped thin membrane having a diameter of 6 mm and a thickness of 0.5 mm. This membrane was designated as Sample 1.

A powdery compatibilized polymer was prepared in the same manner as in Sample 1 except that the amounts of 3,3-diaminobenzidine, polysulfated phenylene sulfonic acid, and isophthalic acid added with respect to polyphosphoric acid were 1.10 g, 4.00 g, and 0.46 g respectively. After that, a disk-shaped thin membrane formed product was manufactured. This membrane was designated as Sample 2. In the compatibilized polymer of Sample 2, the ratio between the sulfonic acid group of polysulfated phenylene sulfonic acid and the NH group of polybenzimidazole was 5:1 in molar ratio.

A disk-shaped thin membrane was manufactured in the same manner as in Sample 1 except that the membrane was composed of only polysulfated phenylene sulfonic acid. This membrane was designated as Comparative Sample.

Example 3

Evaluation of Elution Resistance of Acidic Group-possessing Polymers

The respective disk-shaped thin membrane of Samples 1 and 2 and Comparative Sample were immersed in deionized water, followed by being left to stand for 24 hours at room temperature. After that, titration was performed with an aqueous sodium hydroxide solution to determine the quantity of the mole number of acidic group eluted into the deionized water thereby. The change in amount of the acidic group before and after the immersion was calculated to determine the ratio (retention rate) of the acidic group-possessing polymer retained by the disk-shaped thin membrane assuming that the ratio of the acidic group-possessing polymer of the disk-shaped thin membrane before the immersion was 100.

Results are shown in FIG. 3. According to FIG. 3, it is clear that the retention rate is remarkably high in the disk-shaped thin membranes of Samples 1 and 2 as compared with the disk-shaped thin membrane of Comparative Sample.

Example 4

Evaluation of Proton Conductivity

The respective disk-shaped thin membranes of Samples 1 and 2 and Comparative Sample were dried for 12 hours at 80° C. in a vacuum atmosphere, and then the proton conductivities were measured at 150° C. for the respective disk-shaped thin membranes as a function of the temperature in accordance with the two-terminal high frequency impedance method. Results are shown in FIG. 3. According to FIG. 3, it is clearly understood that the proton conductivities of the disk-shaped thin membranes of Samples 1 and 2 are substantially equivalent to that of the disk-shaped thin membrane of Comparative Sample.

According to the results described above, it is clear that the compatibilized polymers of Samples 1 and 2 are excellent in ability to retain the acidic group-possessing polymer (elution resistance), and the polymers have the excellent proton conductivities even in a dried state. Further, even when the polymers are compatibilized, the proton conductivities are not considerably lowered.

As described above, when the acidic group-possessing polymer and the polybenzimidazole are compatibilized with each other, the elution of the acidic group-possessing polymer into the liquid is remarkably suppressed. Accordingly, for example, even when a fuel cell, which uses the electrolyte of the proton conductive solid polymer electrolyte containing the compatibilized polymer composed of the acidic group-possessing polymer and the polybenzimidazole, is operated-under a condition in which liquid water is produced, it is possible to avoid decrease in proton conductivity.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method for producing a proton conductive solid polymer electrolyte comprising an acidic group-possessing polymer which has an acidic group and a basic polymer which is basic, said method comprising:

dissolving, in a solvent, said acidic group-possessing polymer and a monomer which produces polybenzimidazole by means of polymerization, polymerizing said monomer to produce said polybenzimidazole, compatibilizing said polybenzimidazole and said acidic group-possessing polymer with each other to produce a compatibilized polymer; and separating said compatibilized polymer from said solvent wherein polyphosphoric acid is used as said solvent.

2. A method for producing a proton conductive solid polymer electrolyte comprising an acidic group-possessing polymer which has an acidic group and a basic polymer which is basic, said method comprising:

dissolving, in a solvent, said acidic group-possessing polymer and a monomer which produces polybenzimidazole by means of polymerization, polymerizing said monomer to produce said polybenzimidazole, compatibilizing said polybenzimidazole and said acidic group-possessing polymer with each other to produce a compatibilized polymer; and separating said compatibilized polymer from said solvent, wherein a mixture of aromatic tetramine and aromatic dibasic acid is used as said monomer.

3. A method for producing a proton conductive solid polymer electrolyte comprising an acidic group-possessing polymer which has an acidic group and a basic polymer which is basic, said method comprising:

dissolving, in a solvent, said acidic group-possessing polymer and a monomer which produces polybenzimidazole by means of polymerization, polymerizing said monomer to produce said polybenzimidazole, compatibilizing said polybenzimidazole and said acidic group-possessing polymer with each other to produce a compatibilized polymer; and separating said compatibilized polymer from said solvent, wherein and aromatic compound, which has a carboxylate ester group and a pair of amino group bonded to an aromatic nuclear, said pair of amino group being mutually positioned at ortho-positions, is used as said monomer.

4. The method for producing said proton conductive solid polymer electrolyte according to claim 2, wherein a compound represented by any one of the following chemical formulas (16) to (18) is used as said aromatic tetramine:

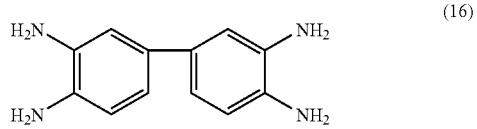
(16)

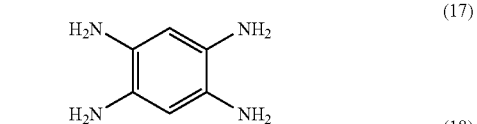
(17)

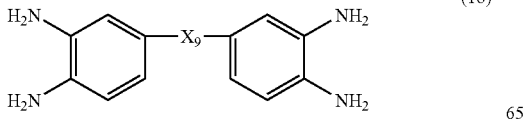
(18)

wherein X9 is any one of O, S, SO$_2$, CH$_2$, and CO in said chemical formula (18).

5. The method for producing said proton conductive solid polymer electrolyte according to claim 2, wherein a compound represented by any one of the following chemical formulas (19) and (20) is used as said aromatic dibasic acid:

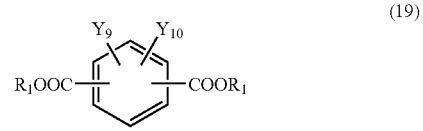
(19)

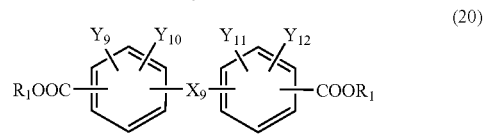
(20)

wherein Y9 to Y12 are functional groups independently selected from H, CH$_3$, C$_2$H$_5$, F, Cl, I, Br, and Ph, and R1 represents H, CH$_3$, C$_2$H$_5$, or Ph (phenyl group).

6. The method for producing said proton conductive solid polymer electrolyte according to claim 3, wherein a compound represented by the following chemical formula (21) is used as said aromatic compound:

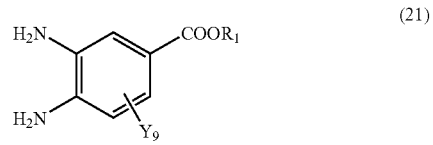
(21)

wherein Y9 is a functional group independently selected from H, CH$_3$, C$_2$H$_5$, F, Cl,I,Br and Ph, and R1 represents H, CH$_3$, C$_2$H$_5$, or Ph (phenyl group).

7. The method for producing said proton conductive solid polymer electrolyte according to claim 4, wherein a compound represented by any one of the following chemical formulas and is used as said aromatic dibasic acid:

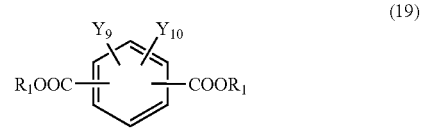
(19)

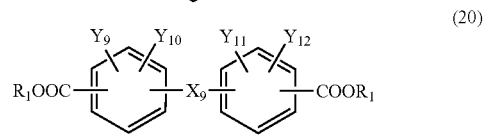
(20)

wherein Y9 to Y12 are functional groups independently selected from H, CH$_3$, C$_2$H$_5$, F, Cl, I, Br, and Ph, and R1 represents H, CH$_3$, C$_2$H$_5$, or Ph.

* * * * *